Dec. 25, 1956  J. A. CARVER  2,775,542
LIQUID-LIQUID EXTRACTION TRAY
Filed Sept. 30, 1953

INVENTOR.
John A. Carver
BY
A. N. Wright  ATTORNEY

United States Patent Office 2,775,542
Patented Dec. 25, 1956

2,775,542

LIQUID-LIQUID EXTRACTION TRAY

John A. Carver, Scotch Plains, N. J., assignor to Esso Research and Engineering Company, a corporation of Delaware Application September 30, 1953, Serial No. 383,349

12 Claims. (Cl. 196—14.52)

The present invention relates to an improved apparatus for countercurrently contacting two incompletely miscible liquids having different densities. The invention has general application in the field of liquid-liquid extraction wherein one liquid is contacted with a second liquid for the purpose of removing desirable or undesirable constituents, as the case may be, from the former liquid. It has particular application in those liquid-liquid contacting processes in which one of the liquids is present throughout the contacting apparatus as a continuous liquid phase, and the other liquid is present as a discontinuous liquid phase.

In accordance with the present invention, a contacting stage construction is employed in a vertical tower which is characterized by concurrent mixing and concurrent settling of a continuous phase liquid and a discontinuous phase liquid in each stage throughout the tower and by counter-current flow of the liquids between the stages. The present apparatus is further characterized by its possession of improved contacting efficiency and improved capacity. It is particularly characterized by a high degree of hydraulic stability over a wide range of liquid flow rates and for a wide variety of liquid-liquid systems. It is especially characterized by an unusual degree of hydraulic stability at very low liquid flow rates.

The invention is directed broadly to processes in which liquids are treated by selective solvent action. At the present time there are a great many chemical processes in which a selective solvent is used to treat a particular liquid in order to secure a partial segregation or removal of chemical constituents from the liquid. For example, petroleum oils are conventionally treated with solvents such as liquid sulfur dioxide, phenol, cresol, nitrobenzene, furfural, aniline, ether and other solvents or mixture of solvents. Contact of these solvents with a petroleum oil is particularly employed to remove low viscosity index constituents from the oil and thereby obtain a treated oil having an improved viscosity index. More generally, such solvent treating processes are employed to selectively remove undesired constituents from the liquid being treated or in some cases to recover desired constituents therefrom.

In solvent treating operations of the general character above described, many modifications of a process nature are conventionally used to control the solvent extraction as desired—for example, auxiliary solvents or modifying agents may be injected into the treating system. Again, a wide range of temperature and pressure conditions may be employed in particular types of solvent extractions. The present invention, however, is not concerned with these types of modifications or refinements. Instead, it is concerned with a basic apparatus that may be used for contacting liquids whatever the particular system may be. It is, therefore, to be understood that this invention is of application to any liquid-liquid contacting system with any of the modifications that may be employed in such processes.

In analyzing the necessary mechanism required in liquid-liquid contacting processes, it is apparent that certain basic effects are required. First, it is necessary that the two liquid phases be completely dispersed so that they come into intimate contact with one another. Second, the resulting mixture of the two liquid phases must be then thoroughly separated in order to recover the two phases. The first of these steps requires the use of mixing equipment which is capable of intimately dispersing the discontinuous phase liquid throughout the continuous phase liquid. The second step requires the use of large settling zones or mechanical devices that are capable of separating the mixtures that have been formed by the mixing operation.

It will be appreciated that a complete transfer of one or more components from one liquid phase into a second liquid phase cannot generally be realized in one mixing and settling operation. For this reason, it is generally necessary to employ forms of mixing apparatus which contain a plurality of contacting stages. Each stage of such an apparatus is comprised of a mixing zone and a settling zone. Generally speaking, the two liquids entering a particular stage in a multi-stage contacting apparatus are first thoroughly admixed and then are thoroughly separated. The separated liquids are then passed to subsequent contacting stages for further treating until the desired degree of component transfer between the two liquids has been realized.

A wide variety of processes and forms of apparatus are presently employed for contacting one liquid with another liquid. Likewise, a wide variety of flow patterns through each form of apparatus have been used with varying degrees of success. In general, it has been found to be more advantageous to effect large volume fluid treating in multi-stage contacting towers rather than in mixers and settlers, centrifuges, and so forth. Processing in towers is more advantageous from the economic point of view because of the lower initial and operating costs. Consequently, considerable attention has been given to the development of apparatus that will provide efficient liquid-liquid contacting in tower forms of contacting apparatus. The towers which have been employed and which are presently employed vary widely in their designs. For example, some employ various types of packing materials; others employ perforated plates; and still others employ a wide variety of internal baffles, plates, etc.

One of the most effective contacting towers developed to date is a multi-stage tower wherein the stages are vertically superposed one upon the other and are separated by horizontal, perforated metal plates. In this type of tower one of the liquids enters the top of the tower, flows down the tower and finally leaves through the bottom of the tower. The second liquid enters the bottom of the tower and after flowing up the tower leaves through the top of the tower. In other words, the overall flow relationship between the two liquids is a countercurrent one.

Sets of perforations in the horizontal plates that separate the stages in this tower allow one of the two liquids to pass from plate to plate through the tower. Similarly, downcomers or other sets of perforations are provided to convey the second liquid from one plate to the next plate. The downcomers and/or sets of perforations associated with the plates are generally positioned so as to provide horizontal flow of one or both of the liquids across the various plates and to thereby induce more complete contacting between the liquids and a closer approach to equilibrium mass transfer. Thus, it is general practice to position the downcomers and the sets of perforations of successive plates on diametrically opposite sides of the tower.

While the perforated plate type of contacting tower has permitted the realization of some improvements in the field of liquid-liquid extraction, this form of apparatus still lacks a number of desirable features. In the first place, towers employing perforated plates generally lack flexibility in that they usually must be carefully designed for the particular liquids and operating conditions that it has been decided to employ in any given case. In this connection, the size of the perforations is generally a particularly critical feature in the design of the individual plates, since the perforations not only disperse or jet the one liquid into the other liquid, but they also maintain a layer of liquid adjacent each plate thereby preventing by-passing of the liquids around the plates. As might be expected, it has been found in actual practice that relatively small upsets in the operation of a perforated plate tower will cause the sealing layers of liquid to disappear with attendant by-passing of the plates.

A second disadvantage associated with perforated plates lies in the fact that such plates are generally characterized by plate efficiencies of generally less than about 50%. The low efficiencies result primarily from incomplete contacting of the two liquid phases in the regions of phase mixing and also from the short time of actual contact between the phases during mixing.

At this point, it will be well to point out that the term plate efficiency (or stage efficiency) as used herein is considered to mean the percentage of the degree of contacting that is realized in a given plate or stage as compared to the equilibrium degree of contacting that is realized in a single stage batch mixer and settler. Thus, one theoretical stage is established by contacting two liquids intimately to equilibrium in a batch mixer followed by a thorough and complete settling in a batch settler. As stated, therefore, conventional perforated plate liquid contacting towers, due to their plate efficiencies of about 50% maximum, require a number of plates exceeding by about a factor of 2 the number of theoretical stages of contacting that would be required for a given liquid-liquid system. Other conventional contacting towers for the most part possess contacting efficiencies of the same order of magnitude as perforated plate type towers. In view of these facts, it is clearly of the greatest importance to improve the plate efficiency (or stage efficiency) of multistage towers in order to decrease the expense of liquid contacting in such towers and also to decrease the size of the towers.

A third failing of perforated type contacting plates lies in the fact that such plates utilize for actual mixing purposes only a relatively small percentage of the total energy that is available in contacting towers and that could be used for this purpose. The energy available for this purpose is, to a great extent, the energy resulting from the difference in the specific gravities of the two liquids that are contacted in the apparatus. In other words, there is a buoyant energy present in the column as a result of the fact that the one liquid has a lower specific gravity than the other liquid. But in spite of the fact that this energy is readily available, perforated plate towers as well as other conventional towers have been able to utilize only a relatively small proportion of the energy for the purpose of mixing the two liquids in each stage within the towers. It is considered that the balance of available energy is dissipated in aimless swirling which takes place as the dispersed phase passes through the continuous phase. Such uncontrolled swirling is relatively ineffective in providing desirable mixing.

Still another failing of perforated—or dispersion—plate towers is the fact that almost all dispersion plates have fixed dispersion areas, and the pressure drops through the perforations in the plates therefore vary with the magnitude of the flow rates of the dispersed phase through the perforations. This feature results in definite limitations on the flexibility of towers of this type with regard to both operating efficiency and hydraulic stability.

Accordingly, it has been an object of the art to improve the contacting efficiency, the hydraulic stability and the flexibility of the various types of counter-current liquid-liquid contacting towers that are in use at the present time. In line with these objectives, a multi-stage tower has been proposed in which the stages are stacked one upon the other in the same manner as has been used for previous towers. The proposed tower is like conventional towers in that a continuous phase liquid and discontinuous phase liquid are introduced within opposite ends of the tower and passed counter-currently to each other through the tower. The proposed tower also resembles conventional towers in its use of downcomer conduits for passing the continuous phase liquid from the settling zone of one stage to the mixing zone of the next stage. Finally, the proposed tower is like conventional towers in that the continuous phase liquid and the discontinuous phase liquid are first mixed and the resulting mixture then separated in each stage of the tower.

The proposed tower, however, differs from previous conventional towers, including perforated-plate towers, in several respects. It is especially different in the manner in which the two liquids are mixed and also in the manner in which the discontinuous phase liquid travels from one stage to the next stage.

In the proposed tower, the discontinuous phase liquid leaves the settling zone of one stage, passes through a liquid trap, flows over (or under) a weir and thence enters the mixing zone of the next stage. The trap is designed so that a layer of discontinuous phase liquid may be automatically maintained in the settling zone of each stage over a wide range of liquid flow rates. The weir generally constitutes a part of the liquid seal and also serves to distribute the continuous phase liquid throughout the stream of continuous phase liquid as the latter liquid enters each mixing zone. Any one of a variety of weir designs, including straight-edge weirs, peripheral weirs, notched weirs, etc., may be employed. A chief advantage of the weir type of flow distributor, as compared with the perforations in a perforated plate, lies in the fact that weirs are characterized by much lower pressure drop operation than are perforations.

The mixing zones in the stages of the proposed contacting tower are separated by means of baffles, plates and the like, from the settling zones in the stages, thus permitting the use of various mixing devices within the mixing zones without undue turbulence being generated in the settling zones.

Certain improvements have also been suggested for incorporation within the proposed tower described above. For example, so-called "split downcomers" and "split mixing zones" have been suggested whereby the tower is provided with even greater improvements in contacting efficiency, capacity, and hydraulic stability. These improvements, the proposed tower design and the present invention may be better understood by reference to the attached figures.

In discussing the figures, it will be noted that the apparatus depicted therein is adapted for use with liquid-liquid systems in which the continuous phase liquid is heavier than the discontinuous phase liquid. It will also be noted that the individual stages as illustrated possess "split" downcomers and "split" mixing zones.

Figure 1:
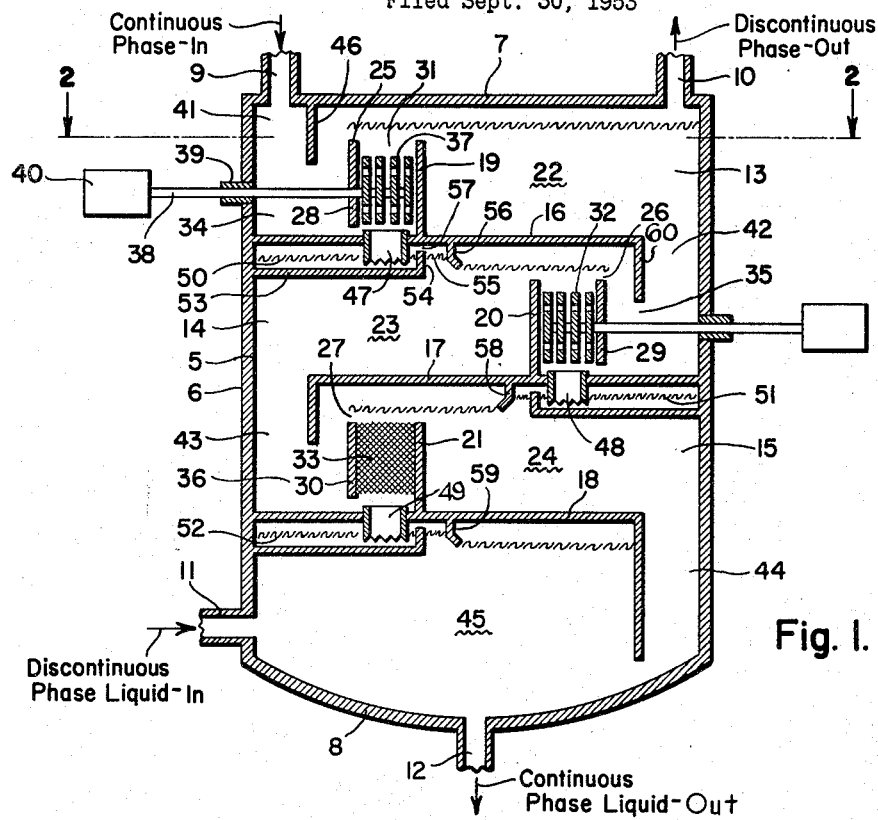
Figure 1 is an elevational, cross-section view of a preferred form of liquid-liquid contacting tower which has included therein an embodiment of the present invention.

Referring first to Figure 1, it will be noted that the apparatus comprises an elongated, cylindrical, vertically disposed vessel 5 which contains side wall 6, a top plate 7 and a bottom plate 8. The vessel is divided vertically into three contacting stages 13, 14 and 15 by the vertically spaced, horizontally disposed, imperforate plates 16, 17 and 18. Each contacting stage, in turn, is divided laterally into a mixing zone and a settling zone by a vertically disposed imperforate plate. Thus, stage 13 is divided into mixing zone 25 and settling zone 22 by vertical plate 19 which is sealed along its lower edge to plate 16. The upper edge of plate 19 terminates vertically in spaced relation with top plate 7. In a similar manner, stage 14 comprises a mixing zone 26 and a settling zone 23; and stage 15 is made up of a mixing zone 27 and a settling zone 24.

Figure 2:
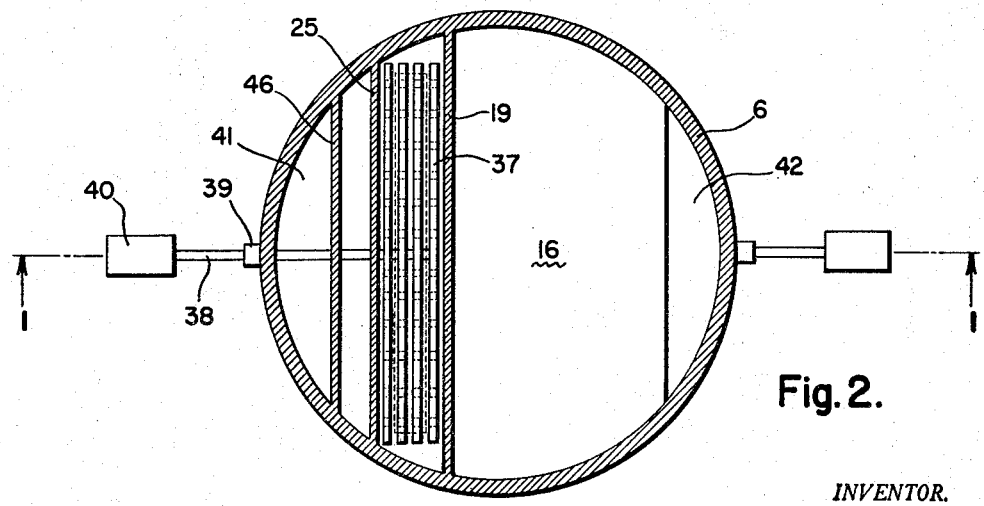
Figure 2 is a cross-section view taken along the plane 2—2 of the apparatus illustrated in Figure 1.

Each mixing zone in the apparatus of Figures 1 and 2 is divided into two laterally juxtaposed sections. Thus, mixing zone 25 is divided by vertically disposed plate 28 into sections 31 and 34. Similarly, mixing zone 26 is split by plate 29 into sections 32 and 35; and mixing zone 27 is divided by plate 30 into sections 33 and 36.

For the purposes of the present description, sections 31, 32 and 33 will be designated as mixing sections and sections 34, 35 and 36 as recycle sections; although mixing actually occurs in both sets of sections. The latter sections, however, are designated herein as recycle sections since portions of the effluents from the mixing sections are recycled to the entrances of the mixing sections via these sections.

Each of the mixing sections 31, 32 and 33 may be provided with means suitable for contacting liquids. Thus, sections 31 and 32 are provided with sets of perforated, vibrating plates of the type described in U. S. application Ser. No. 75,904 of Fenske et al., filed February 11, 1949, now U. S. Patent No. 2,667,407, while section 33 is provided with a bed of packing material, adapted for liquid-liquid contacting. Other suitable mechanical mixers include propellers, paddles, etc. that develop a high degree of shearing action with substantially no pumping action. Suitable packing materials include Berl saddles, Raschig rings, wire mesh, crinkled wire mesh, granulated solids, etc.

In describing the apparatus of Figure 1, it will be appreciated that, in general, perforated plate mixers are preferred to packed mixing zones; but section 33 has been depicted as a packed zone to illustrate how such zones may be employed in conjunction with the present invention.

Referring specifically to the mixing plates 37 in mixing section 31, it will be noted that the flat plane surfaces of the plates are vibrated in a direction that is perpendicular to the direction of liquid flow through the section by a suitable reciprocating driving means 40 and connecting rod 38. Driving means 40 may be actuated hydraulically, electrically, pneumatically, or in any other conventional manner. Suitable devices are well known in the art and do not constitute a critical part of the present invention; hence, it is considered that a full description of them need not be presented here. Rod 38 pierces wall 6 and plate 28 and is free to slide back and forth therein. Rod 38 in piercing wall 6 passes through a suitable packing gland or seal 39.

Referring generally to the mixing zones in Figure 1, it will be observed that there is direct access for the flow of liquids between the exit end of each mixing section and the entrance ends of the recycle section and the settling zone that are adjacent the mixing section. There is also direct access between the entrance end of each mixing section and the exit end of its respective recycle section.

Each contacting stage is further provided with a downcomer conduit for conveying continuous phase liquid from an adjacent stage or from a point outside the vessel proper to the mixing zone of the stage. Thus, stage 13 contains a vertically disposed conduit 41 which is formed by the walls 6 of vessel 5 and vertical plate 46. Conduit 41 is adapted to convey continuous phase liquid from conduit 9 outside vessel 5 into contacting stage 13. Similarly, stage 14 is provided with downcomer conduit 42 which conveys continuous phase liquid from settling zone 22 of stage 13 to mixing zone 26 of stage 23. It will be further noted, of course, that downcomer conduit 42 is in diametrically opposite relation to downcomer conduit 41 with respect to its position within vessel 5. Thus, the continuous phase liquid in passing from stage to stage throughout vessel 5 flows in horizontally opposite directions through the settling zones of successive stages. In addition, the downstream end of the downcomer in each stage preferably vertically overlaps the exit end of the mixing section therein. Thus, in stage 13 downcomer 41 slightly overlaps the upper end of plate 28.

Each contacting stage is also provided with a conduit which conveys discontinuous phase liquid to the mixing zone of the stage from a layer of discontinuous phase liquid that exists immediately below the bottom plate of the stage. Thus, stages 13, 14 and 15 are provided with riser conduits 47, 48 and 49 respectively. Referring specifically to conduit 47, it will be noted that this conduit is vertically disposed and extends beyond plate 16 in both vertical directions. The upper edge of conduit 47 is spaced vertically from plate 16 in order to prevent discontinuous phase liquid from wetting the surface of plate 16 and thus flowing along the surface of the plate rather than vertically upward into mixing section 31.

The lower edge of conduit 47 terminates in a trap chamber 50 which is formed by horizontal plate 53 and vertical plate 54 in combination with a portion of the underside of plate 16. Plate 54 terminates vertically in a spaced relation with the underside of plate 16 and vertically intermediate plate 16 and the lower edge of conduit 47. Thus, a conduit or liquid passageway 57 is provided in trap chamber 50 which conveys discontinuous phase liquid from settling zone 23 into the trap chamber.

Momentarily ignoring baffle plates 56, 58 and 59, it will be seen that the relationship between the lower edge of conduit 47 and conduit 57 provides a liquid trap which in combination with vertical plate 60 traps a layer of discontinuous phase liquid along the underside surface of plate 16. It is apparent that the inter-relationship of these various elements is of a character to automatically maintain this liquid layer over a wide range of liquid flow rates and general operating conditions.

The lower edge of riser conduit 47 constitutes a weir for the flow of discontinuous phase liquid from within trap chamber 50 through conduit 47 and thence into the mixing section 31 of stage 13. The lower edge of conduit 47 may have a perfectly smooth edge and therefore constitute substantially a straight edge weir, but it is preferred that the lower edge of conduit 47 be serrated to form any one of a variety of notch-type weirs as for example a V-notch weir, a trapezoidal weir, a rectangular weir, etc. A particularly preferred type of notched weir is a V-notch weir in which the notches are wide enough and deep enough to accommodate the entire range of expected flow rates for the discontinuous phase liquid. In any case, it is preferred that the stream or streams of discontinuous phase liquid leaving the weir be distributed by the weir in a substantially uniform manner across the cross-section of the entrance to the mixing section. It is also preferred that a plurality of riser conduits and peripheral weirs be employed in each stage rather than a single large conduit and weir.

The advantages from the use of the apparatus just described in contrast to previous conventional towers are several. First, the hydraulic unbalance existing within the overall contacting vessel is never greater than the unbalance occasioned by one mixing zone or mixing section as the case may be. Thus, the mixed phase existing within mixing section 31 is balanced against merely the height of continuous phase liquid existing within the settling zone 22 below the phase interface contained therein. This is so since there is direct communication between continuous phase liquid below the interface under plate 16 and that in downcomer 42. The hydraulic unbalance in stage 13 is unaffected by the mixing zone in stage 14. The reduction in the amount of hydraulic unbalance existing within this apparatus, therefore, has the very desirable result of decreasing the height of each stage and also the height of the overall contacting vessel as compared to previously conventional designs.

Other advantages flowing from the tower design illustrated in Figure 1 (exclusive of plate members 56, 58 and 59) include increased hydraulic stability. In spite of these improvements, however, it has now been found that the tower of Figure 1 and other similar towers may be furnished with an even greater degree of hydraulic stability and overall efficiency than was heretofore possible.

In accordance with the present invention the apparatus illustrated in Figure 1 is modified by incorporating a baffle plate member on the underside of each of the horizontally disposed, imperforate plate members 16, 17 and 18. The baffle plate elements in Figure 1 are identified by the numerals 56, 58 and 59.

Referring specifically to baffle plate element 56, it will be observed that this element extends in a downward direction from plate 16 to a point vertically intermediate the upper edge of plate 54 and the upper edges of plates 20 and 29. In addition, baffle plate element 56 lies laterally between plates 54 and 20. Thus, baffle plate element 56 forms a small flow-rate stabilizing chamber 55 that lies laterally between the entrance to trap chamber 50 and the main layer of discontinuous phase liquid that is contained in settling zone 23.

Still referring to element 56 it is desired that this element be placed as near as possible laterally to the entrance end of conduit 57 without causing excessively large pressure drops to occur in chamber 55 when the discontinuous phase liquid passes through the apparatus at the flow rates desired. In this connection it has been found that in most instances the upper edge of element 56, which is sealed to the underside of plate 16, should be laterally removed from the entrance to conduit 57 a distance at least about equal to the vertical dimension or height of the conduit. In other words, the smallest cross-sectional area of chamber 55 should be at least as large as the cross-sectional area of conduit 57 so that substantially no restriction exists within the chamber for the flow of discontinuous phase liquid through it. Indeed, it is preferred that the minimum cross-sectional area of chamber 55 be at least about 50% greater than the cross-sectional area of conduit 57. Accordingly, it is preferred that the sealed edge of plate 56 be laterally removed from conduit 57 a distance at least 50% greater than the height of conduit 57. In general, it is also desired that the sealed edge of plate element 56 be removed from conduit 57 a distance no more than five times and preferably no more than two times the vertical height of the conduit.

Plate element 56 actually serves several purposes. First, it forms a flow-rate stabilizing chamber 55 as described above. Second, it serves to trap a layer of discontinuous phase liquid adjacent the underside of plate 16. Third, its lower or free edge serves as a weir over which (or in some cases under which) the discontinuous phase liquid must pass in flowing from the aforesaid layer into chamber 55.

The first purpose of plate element 56, that of forming chamber 55 has been previously discussed herein. The structural features required of the plate for this purpose have also been stated.

The second purpose of plate element 56—that of trapping a layer of discontinuous phase liquid—is met by extending the lower edge of the plate to a point vertically intermediate the lower edge of conduit 57 and the upper edge of plate 20. More particularly, the vertical distance between the fixed end of plate 56 and the free end of this same plate should preferably be such that this distance plus the greatest expected depth of discontinuous phase liquid flowing over it should be less than the vertical distance between the fixed end of plate 56 (or the underside of plate 16) and the top of plate 20. It is further preferred that the distance between the top of plate 20 and the phase interface existing within stage 14 be such that no restriction is placed upon the flow of the discontinuous phase liquid in passing from the mixing zone to the settling zone within the stage.

The third purpose of plate 56 is to provide a weir along its lower edge for the discontinuous phase liquid as it flows from the discontinuous phase layer under plate 16 into the flow-stabilizing chamber 55. And in this connection it is desired that the weir and the shape of plate 56 be such that the discontinuous phase liquid flows through chamber 55 and enters conduit 57 with a minimum degree of turbulence and mixing in the chamber. To achieve this objective, it is preferred that plate 56 be of a shape such that the discontinuous phase liquid, after passing over the weir, flows substantially along the under surface of the plate as it traverses chamber 55. In other words, plate 56 is preferably shaped to duplicate or resemble the flow pattern that the discontinuous phase liquid would take in passing over the weir at the lower edge of the plate.

When the hereinbefore described lateral and vertical distances of plate element 56 from conduit 57 are adhered to, it has been found that it is desirable to slope at least a portion of plate element 56 with respect to the horizontal. For example, it has been established that an acute angle of about 20°–40° and especially about 25°–35° between the underside of at least the lower portion of plate 56 and the horizontal is very effective in most instances for the purposes of the present invention. For the liquid-liquid system in which phenol is the continuous phase and mineral oil is the discontinuous phase, an acute angle of about 30° is preferred. In other words, the oil upon passing the weir at the bottom of plate 56 ceases to flow in a substantially horizontal direction and instead flows upward at about a 30° angle.

It will be noted that the upper portion of plate element 56 (e. g. the portion nearest to the sealed edge) may be sloped in a manner similar to the portion nearest the weir portion. It is preferred, however, that the upper portion be more vertically disposed than the lower portion. Thus, it is preferred that the weir edge of the plate be laterally spaced from conduit 57 a distance at least about 50% greater and preferably about 100% greater than the sealed upper edge.

It will be appreciated, of course, that chamber 55 and plate element 56 may take on a variety of geometric configurations other than the embodiment that is illustrated in the attached figures and described above. The precise configuration to be employed in any given instance will be governed to some extent by the nature of the conduit 57 and/or the trap chamber 50. For example, the trap chamber may be cylindrically shaped in which case conduit 57 may be a single opening or a plurality of openings that pierce the trap chamber along substantially its entire circumference. In this instance it is desirable to have plate element 56 be cylindrically-shaped and with trap chamber 50 to give chamber 55 a round, annular-type of structure. In a similar manner, chamber 55 may have a triangular, rectangular, square or other desired type of shape. Thus, the weir along the free edge of element 56 may be a peripheral-type of weir as well as a straight chordal type.

The function of baffle plate elements 56, 58 and 59 and the flow-stabilization chambers associated with them may be better understood by briefly considering the flow pattern of the discontinuous phase liquid as it flows through the various stages contained in vessel 5 in the absence of such baffle plate members and stabilization chambers. Thus, in starting up the apparatus shown in Figure 1, it is generally accepted practice to first completely fill vessel 5 with the continuous phase liquid which is available to the vessel via conduit 9. When the vessel is so filled, the continuous phase liquid is then withdrawn from vessel 5 through conduit 12 at a rate that will keep the inventory of continuous phase liquid within the vessel at a substantially constant value.

The discontinuous phase liquid is then introduced within vessel 5 via conduit 11. This liquid first enters section 45 where it rises until it is trapped beneath plate 18. The layer of discontinuous phase liquid accumulates under plate 18 until it spills over the lower end of riser conduit 49 and flows upwardly into mixing section 33. This procedure is duplicated under plates 17 and 16.

Generally speaking, the process described above will take place satisfactorily over a wide range of flow rates and liquid properties. However, experimentation has revealed that these are conditions under which this process does not function in a satisfactory manner. For example, it has been found that tower upsets are particularly prone to occur when the discontinuous phase liquid flow rates are very low and also when the flow rates of this particular liquid are suddenly and substantially increased. The difficulties that are encountered under these particular circumstances have been found to result from unusual hydraulic unbalance conditions that develop in one or more of the contacting stages.

The mechanism by which these undesirable conditions of hydraulic unbalance occur may be better understood by referring specifically to stage 13 in Figure 1 and by assuming that baffle element 56 and flow stabilization chamber 55 are not parts of the stage. It will be further assumed that the apparatus in Figure 1 has just been put on stream. In line with this latter assumption it will be considered that the continuous phase liquid has progressed through vessel 5 in a conventional desirable manner and that the discontinuous phase liquid, after rising through the vessel, has just formed a phase layer under plate 16 that extends down to the lower edge of riser conduit 47. It is apparent that under such conditions the addition of further amounts of discontinuous phase liquid to the phase layer under plate 16 will cause corresponding amounts of the liquid to be displaced through conduit 47 into mixing section 31. It is further apparent that the amounts of liquid that are displaced into the mixing section must depend at least initially on the rate at which this liquid is flowing up through vessel 5.

It might seem that the rate at which the discontinuous phase liquid enters section 31 should never exceed the rate at which it is passing through vessel 5. However, this is not the case for the reason that the discontinuous phase liquid upon entering section 31 mixes with the stream of continuous phase liquid that is passing through section 31 and forms a mixed phase therein that possesses a lower specific gravity than the column of continuous phase liquid which exists on the same vertical level as mixing section 31 but within settling zone 22 and vertically above downcomer conduit 42.

The difference in the specific gravity between the liquid in section 31 and the liquid in settling zone 22 above conduit 42 generates a condition of hydraulic unbalance that operates around the lower edge of plate 60 to displace additional amounts of liquid from the layer under plate 16 into the mixing section 31. If the condition of hydraulic unbalance is sufficient to drive the discontinuous phase liquid from beneath plate 16 into mixing section 31 at a greater rate than the liquid is supplied to plate 16 from the lower stages in vessel 5, it is apparent that the layer of discontinuous phase liquid under plate 16 may be rapidly and substantially completely depleted. Experimentation has established that such a condition can and actually does occur.

When the phase layer under plate 16 has been exhausted, the flow of discontinuous phase liquid into zone 13 ceases until sufficient discontinuous phase liquid has again accumulated under plate 16 to cause it to again flow into conduit 47 and section 31. Needless to say, the entire procedure may easily recur with the result that the overall apparatus may operate in a very inefficient and unsatisfactory manner.

It is a primary object of the present invention to greatly reduce or entirely eliminate the undesirable operating conditions that have been just described. The present invention achieves this objective by means of baffle plates 56, 58 and 59 and their corresponding flow rate stabilization chambers. The nature of these plates and their stabilization chambers has been presented at length earlier in this description. They may be better understood, however, by briefly considering the manner in which they operate to avoid undesirable conditions of hydraulic unbalance, contacting, etc. Accordingly, it will once more be assumed that vessel 5 has just been started up; that the continuous phase liquid is passing through the vessel in a conventional manner; and that the discontinuous phase liquid has just formed a layer under plate 16 which extends downwardly to the lower edge of riser conduit 47. In considering the discontinuous phase layer under plate 16, however, it is apparent that the discontinuous phase liquid in accumulating there first forms a layer that extends laterally from plate element 56 to plate 60. It is further apparent that when the layer formed therein has reached the lower edge of plate element 56, the discontinuous phase liquid then flows over this edge into chamber 55 and thence through conduit 57 into trap chamber 50 where it accumulates until the phase layer in chamber 50 builds up to the weir edge of riser conduit 47. At this point, any additional amount of discontinuous phase liquid supplied to the layer beneath plate 16 causes a corresponding amount of the liquid to be displaced into mixing section 31. Here it mixes with the stream of continuous phase liquid described earlier herein. As before, a condition of hydraulic unbalance is generated which acts around the lower edge of plate 60 to cause the discontinuous phase liquid in chamber 55 to be displaced into trap chamber 50 and thence into section 31. As a result of this development, the layer of discontinuous phase liquid in chamber 55 may be depleted to the level of conduit 57 at which time continuous phase liquid will enter this conduit and break the liquid seal between stages 13 and 14. It will be noted, however, that the upset condition generated in this manner is shortlived since the main body of discontinuous phase liquid under plate 16 is still trapped there between plates 56 and 60. Discontinuous phase liquid therefore continues to flow into chamber 55, and it reestablishes the seal therein substantially as fast as it is lost. This filling and depletion of chamber 55 will reoccur until the apparatus has reached a condition of dynamic equilibrium where the undesirable conditions do not take place. It has been established experimentally that such equilibrium conditions are readily attained and maintained with the flow rate stabilization chambers and baffle plate elements of the present invention. It has also been established that the contacting apparatus operates at a high degree of efficiency even during the time when the emptying and refilling of the stabilization chambers is taking place.

It will be noted that the foregoing description has been concerned with merely one embodiment of the present invention. As indicated earlier, the present invention may take on a large number of structural modifications; it may be incorporated within a wide variety of contacting towers; and it may be used in substantially any of the conventional liquid-liquid contacting processes.

In so far as structural modifications of the present apparatus are concerned, it has been pointed out earlier herein that the flow rate stabilization chambers and their associated baffle elements may be constructed in various ways. The baffle elements may be straight plates, or they may be bent and inclined so as to provide the discontinuous phase flowing over them with a streamline type of flow pattern. Again, the baffle elements may be peripheral in design in which case the stabilization chambers become annular types of structures.

The foregoing description of the present invention has been concerned primarily with a contacting stage construction in which a split downcomer and a split mixing zone are employed. It will be understood that the present invention is not, however, limited to this particular type of stage design. It may also be readily incorporated within contacting stages that utilize conventional, long downcomers which extend to the very entrances of the mixing zones. Likewise, it may be employed in stages which contain mixing zones that have no recycle sections. Or it may be employed in stages that have a recycle section laterally intermediate the mixing section and the settling zone rather than laterally intermediate the downcomer and the mixing section. And, it may also be used in conjunction with mixing zones that possess mechanical mixers, packed beds, or no mixing aids at all. The apparatus of the present invention may also be employed in processes where the lighter liquid in the process is the continuous phase liquid in the apparatus.

In this instance, the tower need merely be inverted to perform satisfactorily. In either type of liquid system, however, the heavier of the two liquids always enters the top of the tower; and the continuous phase liquid always passes through the same conduits, etc. The discontinuous phase liquid, likewise, is always the liquid that flows over the weirs and through the riser conduits.

Finally, the present invention may be employed in any of the conventional liquid-liquid contacting processes that involve liquids which are substantially immiscible and that have different specific gravities. In the field of petroleum refining alone, it may be used in the acid-treating, caustic-treating and solvent-extraction of mineral oils. It may also be used in dewaxing, sweetening and other types of refining operations.

What is claimed is:

1. An improved apparatus for countercurrently contacting two incompletely miscible liquids having different specific gravities wherein one of the liquids is present as a continuous phase and the other liquid as a discontinuous phase which comprises in combination a vessel; a plurality of vertically spaced contacting stages in said vessel; a first conduit for introducing the heavier liquid within the top of the vessel; a second conduit for withdrawing the heavier liquid from the bottom of the vessel; a third conduit for introducing the lighter liquid within the bottom of the vessel; a fourth conduit for withdrawing the lighter liquid from the top of the vessel; a vertically disposed, laterally confined mixing zone in each stage; the mixing zones of successive stages being on opposite sides of said vessel; the outlet ends of the mixing zones facing toward the end of the vessel where the continuous phase liquid enters the vessel; a horizontally disposed settling zone in each stage whereby mixtures of the two liquids are separated into separate phase layers; the outlet end of each mixing zone discharging directly into the entrance end of its respective settling zone; a fifth conduit in each stage; the fifth conduit in any given stage being adapted to convey continuous phase liquid from the continuous phase layer in the settling zone of a stage on one side of the given stage to the entrance end of the mixing zone in the given stage; a sixth conduit in each stage; the sixth conduit in said given stage being adapted to convey discontinuous phase liquid from the discontinuous phase layer in the settling zone of a stage on the opposite side of the given stage into the entrance end of the mixing zone of the given stage; a liquid seal in each said sixth conduit whereby a phase layer of discontinuous phase liquid is provided in each settling zone; a weir intermediate the outlet end of each sixth conduit and the entrance end of its respective mixing zone; a baffle element laterally intermediate the discontinuous phase layer in the settling zone of each stage and the inlet end of the sixth conduit that conveys the discontinuous phase liquid to the next stage; each said baffle element forming a flow-rate stabilization chamber in its respective stage, said stabilization chamber lying laterally between the said baffle element and the inlet to the 6th conduit.

2. Apparatus as defined in claim 1 in which each flow rate stabilization chamber is larger in its cross-sectional area than the sixth conduit immediately adjacent the chamber.

3. Apparatus as defined in claim 2 in which each baffle element is of a shape to prevent flow turbulence in its respective stabilization chamber.

4. Apparatus as defined in claim 3 in which each baffle element is a plate-type element.

5. Apparatus as defined in claim 3 in which each baffle element is a peripheral-type element.

6. Apparatus as defined in claim 3 in which each mixing zone contains a vertically disposed recycle section adapted to return a portion of the mixture flowing from the exit end of the mixing zone back to the entrance end of the zone.

7. Apparatus as defined in claim 6 in which each recycle section is laterally intermediate its mixing zone and its settling zone.

8. Apparatus as defined in claim 6 in which the recycle section in each stage is laterally intermediate the fifth conduit and the mixing zone in the stage.

9. Apparatus as defined in claim 8 in which the downstream end of the fifth conduit in each stage terminates vertically intermediate the vertical extremities of the mixing zone in the stage.

10. An apparatus for countercurrently contacting two incompletely miscible liquids which possess different specific gravities wherein one of the liquids is present as a continuous phase and the other liquid as a discontinuous phase which comprises in combination a vertically disposed vessel, a plurality of vertically spaced horizontally disposed imperforate plates within said vessel and dividing said vessel into a plurality of vertically superposed treating stages, first conduit means for introducing the continuous phase liquid at a first end of said vessel, second conduit means for withdrawing the continuous phase liquid from the opposite end of said vessel, third conduit means for introducing the discontinuous phase liquid at said opposite end of said vessel, fourth conduit means for withdrawing the discontinuous phase liquid from said first end of said vessel, the conduit means for introducing the heavier of the two liquids being located at the top end of the vessel, a horizontally disposed settling zone in each stage adapted to separate mixtures of the two liquids into separate phases, a vertically disposed laterally confined mixing zone in each stage adapted to mix the two liquids and to discharge the mixture directly into the settling zone of the same stage, the upstream end of each mixing zone being sealed from its respective settling zone, the mixing zones of successive stages being laterally opposite from one another within said vessel, a plurality of first conduits within said vessel to convey the continuous phase liquid from stage to stage, each one of said first conduits piercing one of said imperforate plates to convey continuous phase liquid from the settling zone of a stage on one side of each said plate to the mixing zone of the stage lying on the opposite side of the plate, a plurality of second conduits to convey the discontinuous phase liquid from stage to stage within the vessel, each said second conduit piercing a separate imperforate plate, the downstream end of each second conduit discharging into the mixing zone of a stage on one side of each said plate, the upstream end of each second conduit terminating within the settling zone of the adjacent treating stage on the opposite side of the plate, liquid seal means associated with the upstream end of each second conduit to maintain a layer of discontinuous phase liquid in the settling zone of the adjacent stage, baffle means laterally spaced from the liquid seal means in each stage to maintain a layer of discontinuous phase liquid in the settling zone of each said stage independently of the liquid seal means.

11. A process for countercurrently contacting two incompletely miscible liquids having different specific gravities wherein one of the liquids is present as a continuous phase and the other as a discontinuous phase which comprises maintaining a plurality of vertically superposed confined treating stages; introducing the heavier liquid to the uppermost stage and withdrawing the heavier liquid from the bottommost stage; introducing the lighter liquid to the bottommost stage and withdrawing it from the uppermost stage; mixing the two liquids in each stage in a vertical, concurrent, laterally confined flow path; settling the resulting mixture in each stage into two phases by passing it laterally through a settling zone; passing the continuous phase liquid from the continuous phase layer in the settling zone of each stage to the mixing step in the mixing zone of the next adjacent stage; damming and thereby maintaining a layer of the discontinuous phase liquid in the settling zone of each stage; additional discontinuous phase liquid entering each such stage displacing settled liquid from the dammed phase layer; trapping the displaced liquid from the dammed phase layer in a liquid seal zone in the settling zone of each stage, thereby displacing discontinuous phase liquid from the liquid seal; dispersing the displaced liquid from the liquid seal zone in the form of a weir sheet and conveying the dispersed liquid into the mixing zone of the next adjacent treating stage.

12. A process as defined in claim 11 in which a portion of the mixture flowing from each mixing zone is recycled to the same mixing zone.

References Cited in the file of this patent

UNITED STATES PATENTS

| | | |
|---|---|---|
| 2,151,592 | Ferris | Mar. 21, 1939 |
| 2,290,209 | Rosenthal | July 21, 1942 |
| 2,520,391 | Findlay | Aug. 29, 1950 |
| 2,580,010 | Fenske et al. | Dec. 25, 1951 |
| 2,609,276 | Casler et al. | Sept. 2, 1952 |
| 2,667,407 | Fenske et al. | Jan. 26, 1954 |
| 2,710,790 | Rupp et al. | June 14, 1955 |